2,704,754

PHARMACEUTICALS

Kathryn A. Losee, Jack Bernstein, and Harry Louis Yale, New Brunswick, N. J., assignors to Olin Mathieson Chemical Corporation, New York, N. Y., a corporation of Virginia No Drawing. Application February 4, 1953, Serial No. 335,154

1 Claim. (Cl. 260—211)

Primarily, this invention relates to, and has for its object the provision of, certain heterocyclic carboxylic acid hydrazones, acid-addition salts of those hydrazones having a basic nitrogen atom, and methods for preparation of these compounds. These compounds are valuable chemotherpeutic agents, having antimycobacterial (especially antituberculous) properties.

The compounds of this invetnion (unsalified) are those of the general formula

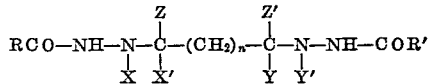

wherein R and R' are the same or different heterocyclic radicals, $n$ is a whole number including zero; Z is a member of the group consisting of hydrogen, alkyl, and hydroxy-substituted alkyl; Z' is a member of the group consisting of hydrogen and alkyl; and X, X', Y and Y' are each hydrogen, except when X and X' or Y and Y', taken together, represent an additional N—C Bond. The alkyl groups in the general formula are preferably lower alkyl; and the heterocyclic radicals are preferably pyridyl, notably such that RCO is isonicotinoyl. The heterocyclic radicals, though preferably unsubstituted, may contain substituents, such as amino, chloro, bromo, iodo, fluoro, hydroxy, alkoxy (e. g. methoxy, ethoxy, isobutoxy, etc.), alkyl (e. g. methyl, ethyl, isopropyl, octyl, nonyl, etc.), nitro and mercapto groups.

The compounds of this invention may be prepared by reacting at least one heterocyclic carboxylic acid hydrazide with the desired dicarbonyl compound (e. g. dialdehyde, diketone or ketone aldehyde) in accordance with the following reaction equations:

(I)
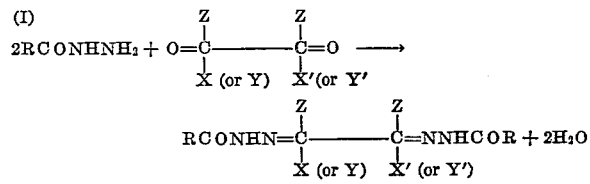

(II)
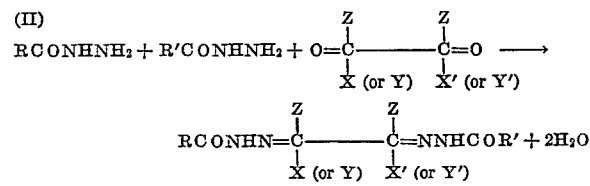

Variations will be obvious to one skilled in the art. Thus, although it is preferred to react the selected heterocyclic carboxylic acid hydrazides with dicarbonyl compounds, one may react the hydrazides of the dicarbonyl compounds with the selected heterocyclic carboxylic acids in reactive forms (e. g. anhydride, acid halides, etc.). Among the hydrazides utilizable in the preparation of the compounds of this invention are (preferably) those of the pyridine carboxylic acids, such as nicotinic, isonicotinic, picolinic, nipecotic and isonipecotic; also substituted derivatives thereof, such as 3-aminoisonicotinic, 2-bromoisonicotinic, 3-chloroisonicotinic, 2,6-diisobutoxynicotinic, 2-fluoroisonicotinic, 2-isobutoxyisonicotinic, 3-methylisonicotinic, 2-methyl-3-hydroxy-5-hydroxymethylisonicotinic, isonicotinic-1-oxide, 2-mercaptoisonicotinic-1-oxide, 1-acetylisonipecotic, 1-dimethylcarbamylisonipecotic and 1-methylisonipecotic. However, one may use the hydrazides of other heterocyclic acids, such as 2-furoic, 3-furoic, 2-thiophenecarboxylic, 3-thiophenecarboxylic, 2-pyrrolecarboxylic, 3-pyrrolecarboxylic, 2-imidazolecarboxylic, and 5-imidazolecarboxylic; also hydrogenated or substituted derivatives thereof, such as 5-nitro-2-furioc, tetrahydro-2-furoic, 1-methyl-2-pyrrolecarboxylic, 2-pyrrolidinecarboxylic and 2-mercapto-5-imidazolecarboxylic.

Among the dicarbonyl compounds useful as reactants are glyoxal, methyl glyoxal, dimethyl glyoxal, acetyl acetone, succinaldehyde and glucosone.

The hydrazones produced may be reduced to the corresponding hydrazines, which reduction is preferably effected by treatment with hydrogen in the presence of a catalyst, such as platinum dioxide, palladium on charcoal, etc., until the required amount of hydrogen has been absorbed. The reduction may also be effected by treatment with nascent hydrogen provided by sodium in liquid ammonia, sodium amalgam, zinc-copper couple, etc.; or electrolytic reduction may be used.

More complete hydrogenation will, of course, not only result in saturation of the C=N bond but will also transform a pyridine nucleus (for example) to a piperidine nucleus; or such products may be obtained by utilizing the hydrazide of a piperidine carboxylic acid (for example) as starting material (e. g. isonipecoctic acid).

As solvent in the hydrogenation, one may use any solvent inert to the reaction, such as a lower alkanol (e. g. methanol, ethanol, etc.), water, acetic acid, dioxane, and cyclohexanol.

Wide latitude is permissible with respect to reaction conditions. Thus, in preparing the hydrazones, the proportions of reactants used may be altered as desired; and, although water is preferred as the reaction medium, other solvents (such as the lower alkanols, dioxane, the cellosolves and dimethylformamide) may be used.

In the synthesis of the hydrazines, one may prepare and isolate the hydrazone and then hydrogenate to obtain the desired hydrazine; or one may carry out the hydrazone formation and hydrogenation thereof in a single step, or in the same reaction medium.

Acid-addition salts may be obtained of those compounds having a basic nitrogen atom (e. g. pyridine carboxylic acid derivatives). Thus, salts with hydrochloric acid may be formed in aqueous solution or under anhydrous conditions, for example, by passing hydrogen chloride gas into an ethereal solution of the free base; and other salts, such as those of sulfuric acid, phosphoric acid, p-aminosalicyclic acid, p-toluenesulfonic acid, methionine, sulfamic acid, lactic acid, citric acid and gluconic acid may be formed by the conventional treatments.

The compounds of this invention may be prepared for use by association of a therapeutically-active quantity thereof (at least 0.1%) with a carrier, which is preferably a solid material, but which may be a sterile liquid vehicle or a liquid pharmaceutical carrier, such as a syrup. Thus, the formulations may take the form of tablets, powder packets, capsules, or other dosage-unit forms which are useful for oral administration. These may be prepared in the conventional manner. For example, two-piece gelatin capsules may be made containing a mixture of the compound and excipient (e. g. starch, talc, stearic acid, magnesium stearate), the compound being present in an amount of the order of about 10 to 100 mg. or more. Also, one-piece gelatin capsules may be prepared containing the desired dosage (e. g., of the order of 10 to 100 mg. or more) of the compound in sufficient corn oil to render the compound capsulatable. Tablets may be prepared to contain of the order of 10 to 250 mg. or more of the compound using starch, lactose or other conventional excipient, and may be scored to enable one to take fractional dosages, if desired. Any of the tableting materials used in pharmaceutical practice may be employed where there is no incompatibility with the particular compound.

The compound may also be prepared for use in liquid (solution or suspension) form. Thus, a composition may be prepared to contain about 5 mg. or more of the compound per ml. of liquid pharmaceutical carrier, such as a carbohydrate-containing (e. g., syrup) or an aqueous-alcoholic vehicle.

In all compositions where such excipient as lactose is used, sugar-alcohols, such as sorbitol or mannitol, may be substituted.

In addition to their use in man, the compounds of this invention may be used with similar therapeutic effect in animals, such as poultry and cows. For such use, they may take the form of animal feed compositions, such as poultry feed compositions containing at least 0.1 percent of the compound and a significant amount of nutritive material.

The following examples are illustrative, but not intended in any way to limit the scope, of this invention

EXAMPLE 1

*Bis-isonicotinoylhydrazone of glyoxal*

54.8 g. isonicotinic acid hydrazide is dissolved in a liter of water and about 38.8 g. glyoxal (in 30% aqueous solution) are added. On standing for a few minutes, a crystalline precipitate separates from the mixture. The precipitate is isolated by filtration, then washed with about 2 liters of boiling water to yield about 53 g. bis-isonicotinoylhydrazone of glyoxal (M. P. over 300° C.). Addition of dry hydrogen chloride to the hydrazone in ethyl ether yields the hydrochloride salt.

EXAMPLE 2

*Bis-isonicotinoylhydrazone of glucosone*

To 33 g. glucosone in 350 ml. warm water is added 50.6 g. isonicotinic acid hydrazide, and the mixture is heated on a steam bath for about an hour. On cooling, the solid material which separates is filtered off. This crude product is added to 800 ml. methanol containing a decolorizing charcoal (Darco) and the mixture is refluxed for one hour, then filtered. The filtrate, a methanol solution of the hydrazone, is retained. To the residue is added 800 ml. methanol and the mixture is again refluxed for one hour, then filtered. To the residue is added 600 ml. water, and the mixture is refluxed for about one hour, then filtered. On cooling, the bis-isonicotinoylhydrazone of glucosone separates (M. P. 204–206° C. dec.). The combined methanol filtrates are also allowed to stand, and the additional yield of bis-isonicotinoylhydrazone of glucosone which separates is isolated by filtration (M. P. 204–206° C. dec.).

EXAMPLE 3

*Bis-isonicotinoylhydrazone of methyl glyoxal*

27.4 g. isonicotinic acid hydrazide is dissolved in 250 ml. water and 24.0 g. methyl glyoxal (in 30% aqueous solution) are added. On standing for about 5 minutes, a crystalline precipitate separates. The precipitate is isolated by filtration to obtain about 23 g. bis-isonicotinoylhydrazone of methyl glyoxal. For purification, the product is dissolved in 250 ml. hydrochloric acid (10% aqueous) and the solution is treated with a decolorizing charcoal (Darco) and filtered. The filtrate is neutralized with 10% aqueous sodium hydroxide; and the precipitated solid is filtered and washed, first with water, then with ethanol and ethyl ether, to yield the purified product (M. P. over 300° C.).

EXAMPLE 4

*Bis-isonicotinoylhydrazone of dimethyl glyoxal*

27.4 g. isonicotinic acid hydrazide is dissolved in 500 ml. water and 8.6 g. dimethylglyoxal (30% aqueous solution) is added. On standing about ½ hour a crystalline precipitate separates. The precipitate is then washed, first with water and then with ethanol and ethyl ether, and isolated by filtration to obtain the bis-isonicotinoylhydrazone of dimethylglyoxal. For purification, the product is dissolved in 270 ml. hot glacial acetic acid, then filtered, cooled to room temperature and neutralized with 10% aqueous sodium hydroxide. The precipitated solid is filtered off, and washed with water, then with ethanol and ethyl ether to yield the purified product. Addition of dry hydrogen chloride to the hydrazone in ethyl ether yields the hydrochloride salt.

Treatment of 50 g. free base in 150 ml. absolute ethanol and 300 mg. platinum dioxide with hydrogen at room temperature, with shaking, until the theoretical amount of hydrogen is absorbed (at .2 mol.) yields the corresponding hydrazine. This hydrazine may be isolated by filtering off the catalyst and concentrating the filtrate under nitrogen and reduced pressure. Further treatment with HCl yields the hydrazine hydrochloride.

EXAMPLE 5

*Bis-isonicotinoylhydrazone of acetylacetone*

A mixture of 21.9 g. acetylacetone and 27.4 isonicotinic acid hydrazide in 75 ml. water is warmed on a steam bath until a solution is formed. On cooling, the solid which separates is collected by filtration. Recrystallization from water yields purified bis-isonicotinoylhydrazone of acetylacetone having a melting point of 254–256° C.

EXAMPLE 6

*Bis-isonicotinoylhydrazone of succinaldehyde*

To a suspension of 64 g. 2,5-diethoxytetrahydrofuran in 150 ml. water is added 25 ml. 20% aqueous hydrochloric acid. The mixture is allowed to remain at room temperature for about 2 hours with occasional shaking, then neutralized with calcium carbonate. The mixture is filtered to remove excess calcium carbonate and any other solid impurities. The filtrate is added to a solution of 54.8 g. isonicotinic acid hydrazide in 500 ml. water. The solid which separates is collected by filtration, then washed with ethanol and ethyl ether. On recrystallization from ethanol, purified bis-isonicotinoylhydrazone of succinaldehyde (M. P. 202–203° C.) is obtained.

This invention may be variously otherwise embodied within the scope of the appended claim.

We claim:
Bis-isonicotinoylhydrazone of glucosone.

No references cited.